United States Patent [19]

Ziese

[11] Patent Number: 4,611,313
[45] Date of Patent: Sep. 9, 1986

[54] METHOD FOR ACOUSTICALLY SURVEYING THE SURFACE CONTOURS OF THE BOTTOM OF A BODY OF WATER

[75] Inventor: Rolf Ziese, Bremen, Fed. Rep. of Germany

[73] Assignee: Fried. Krupp Gesellschaft mit beschränkter Haftung, Essen, Fed. Rep. of Germany

[21] Appl. No.: 653,431

[22] Filed: Sep. 21, 1984

[30] Foreign Application Priority Data

Oct. 20, 1983 [DE] Fed. Rep. of Germany ....... 3338050

[51] Int. Cl.[4] .......................... H04B 17/00; G01S 9/66
[52] U.S. Cl. .......................................... 367/88; 367/13; 73/1 D
[58] Field of Search ...................... 367/7, 8, 11, 13, 88, 367/92, 103, 113, 115, 119, 138, 905, 104, 120; 343/5 CM, 5 PC; 181/124; 73/1 D

[56] References Cited

U.S. PATENT DOCUMENTS

| | | | |
|---|---|---|---|
| 3,144,631 | 8/1964 | Lustig et al. | 343/5 CM |
| 3,191,170 | 6/1965 | Lustig et al. | 367/88 X |
| 3,296,579 | 1/1967 | Farr et al. | 343/5 CM |
| 3,641,484 | 2/1972 | White et al. | 367/88 X |
| 3,895,339 | 7/1975 | Jones et al. | 367/88 X |

FOREIGN PATENT DOCUMENTS

| | | |
|---|---|---|
| 2045276 | 3/1972 | Fed. Rep. of Germany . |
| 3020508 | 1/1982 | Fed. Rep. of Germany . |
| 1330472 | 9/1973 | United Kingdom ................. 367/13 |
| 0783736 | 11/1980 | U.S.S.R. ............................... 367/13 |

OTHER PUBLICATIONS

Herman Medwin; "Speed of Sound in Water: A Simple Equation for Realistic Parameters; J. Acoust. Soc. Am., vol. 58, No. 6, Dec. 1975; pp. 1318–1319.

*Primary Examiner*—Charles T. Jordan
*Assistant Examiner*—Brian S. Steinberger
*Attorney, Agent, or Firm*—Spencer & Frank

[57] ABSTRACT

A method for the acoustic surveying of the surface contours of the bottom of a body of water by means of a crossed fan beam echo sounding arrangement wherein, for the purpose of obtaining an accurate, unfalsified surface contour, the measured contours obtained by scanning the bottom of the body of water in a direction transverse to direction of the heading of the surveying ship are recalculated by means of a continuously checked and adapted correction value. The correction value is determined from deviations between a calibration contour and a test contour. The calibration contour is a longitudinal contour which is formed from measured contours lined up in the direction of the ship's heading and cover a strip on the bottom of the body of water extending perpendicularly below the path traversed by the surveying ship. The test contour is recorded in the same manner as the measured contour but with the echo sounder pivoted by 90° about the elevation axis of the ship, i.e. from the same strip of ground perpendicularly below the fore-to-aft axis of the ship with which the calibration contour is associated.

7 Claims, 10 Drawing Figures

METHOD FOR ACOUSTICALLY SURVEYING THE SURFACE CONTOURS OF THE BOTTOM OF A BODY OF WATER

BACKGROUND OF THE INVENTION

The present invention relates to a method for acoustically surveying the surface contours of the bottom of a body of water, particularly the bottom of the ocean. More particularly, the present invention relates to a method for acoustically surveying the surface contours of the bottom of a body of water, particularly the bottom of the ocean, with the use of an echo sounder installed on a ship and including a transmitting and a receiving device wherein the transmitting device emits sound pulses over a narrow (when seen in the direction of the ship's heading) transmitter target strip extending on the bottom of the body of water essentially perpendicularly below the center of the transmitting antenna and transversely to the ship's heading, wherein the transmitter target strip is covered, by means of the receiving device, by a fan which extends, in the ship's heading, in the form of a series of narrow receiving strips forming a row transversely to the ship's heading with one receiving strip being disposed essentially perpendicularly below the center of the receiving antenna, and wherein the echos produced at the bottom of the body of water in the transmitter target strip are received separately from the individual receiving strips, with the travel times of the received echoes being measured and depth values being determined therefrom to produce a measured contour of the transmitter target strip extending transversely to the ship's heading, in spatial association with the respectively determined point of origin of the echoes as determined by the momentary position of the transmitter target strip and the respective receiving strip.

The contours measured according to this process of the individual transmitter target strips, when aligned in the direction of the heading of the surveying ship, will provide a surface contour representation that corresponds to the actual conditions of the scanned bottom of a body of water only if the speed of sound can be considered to be essentially constant over the entire ranging area. However, this can generally not be assumed to be the case. Rather, it is characteristic for ocean water that thin, changing layers are formed which separate layers of water of different density or speed of sound. As a result of climatic or oceanic phenomena, such as, for example, heating or cooling in the course of a year or day, churning due to heavy seas, formation of internal waves in a period of time from minutes to hours, and/or confluence of masses of water from different origins, the layers having different speeds of sound are constantly changing. The consequences are distorted surface contours.

In a known method of the above-mentioned type (U.S. Pat. No. 3,296,579, issued Jan. 3, 1967) compensation for the contour distortions is provided in that a computer receives so-called bathythermogram data in order to calculate the measured contours from the echo travel time and the receiving direction. Under consideration of these data, the computer calculates the corresponding spatial, horizontal and vertical coordinates of the actual origin of the echo. The barhythermogram data are picked up from bathythermograph recordings. Since the layers of water within the sea area being surveyed may change due to the above-mentioned phenomena by the minute or the hour as well as due to the increased distances traveled by the surveying ship, it is necessary for accurate surveying work to produce such bathythermograms continuously or at very short time intervals in the area where the coutour measurements are taking place. However, recording a bathythermogram is a complicated and time consuming procedure which reduces the operating speed of the surveying ship to a barely acceptable degree. Therefore, one usually is satisfied with producing such bathythermograms at greater spatial or time intervals, which then is done at the cost of the accuracy of the surface contours being measured.

SUMMARY OF THE INVENTION

It is the object of the present invention to provide a method of the type defined above for the acoustical surveying of the surface contours of the bottom of a body of water, with which accurate and correct values can be obtained for the surface contours of the scanned bottom of the body of water with the surveying ship advancing or operating at high speed.

The above object is achieved in a method for acoustically surveying the surface contours of the bottom of a body of water of the type defined above in that: a calibration contour, which extends in the direction of the ship's heading essentially perpendicularly underneath the center of the receiving antenna, is formed from a plurality of measured contours lined up in the direction of the ship's heading; at selectable points in time, the transmitter target strip and the fan of receiving strips are pivoted temporarily out of their basic or measuring position by a right angle about the elevation axis of the ship; in this pivoted or calibration position, a contour of the transmitter target strip, which now extends in the direction of the ship's heading, is recorded as a test contour; the test contour and a section of the calibration contour which lies in the same space are compared with one another and at least one correction value is derived from any deviations; and, the measured contours are corrected by means of the correction value in order to determine the surface contour.

With the method according to the present invention it is possible, without interrupting the surveying process, to continuously and very quickly obtain a correction value which accurately considers the speed of sound conditions existing at the momentary measuring location. A temporary pivot of the transmitting beam and the receiving beam fan by 90° about the ship's elevation axis during the constant scanning of the bottom of the water is sufficient to record a test contour. Since previously, or subsequently, the same spatial strip of the sea bottom from which the test contour has been made was, or will be, scanned successively during the advance of the surveying ship by means of a vertically oriented receiving beam whose path is not influenced by changes in the speed of sound, this strip of sea bottom which extends vertically downwardly below the ship when seen in the direction of travel yields a calibrating contour which corresponds to the true conditions. The correction value can then be determined from the calibrated contour and from the test contour, and this value must be included in the compensation calculations for eliminating distortions in the measured contours. The recording of bathythermograms during the surveying trip is thus superfluous.

According to an advantageous feature of the invention a velocigram is obtained as the correction value and the correction of the measured contours is effected with the aid of the actual sound beam curve that can be calculated therefrom. Preferably, in order to determine the velocigram, an ideal sound beam curve associated with the test contour is corrected by means of an estimated velocigram estimated with the aid of the deviations of the test and calibration contours, and a corrected test contour resulting from the corrected sound beam curve is compared with the calibration contour. If there is a deviation between the corrected test contour and the calibration contour, the estimated velocigram is changed and the calculation of the corrected sound beam curve is repeated on the basis of the singly or multiply changed estimated velocigram until a resulting corrected test contour coincides with the calibration contour, with the last changed estimated velocigram forming the desired correction value.

Such a calculation and correction of a beam path associated with the test contour by means of an estimated velocigram can be performed very quickly by means of a field computer. If a known velocigram of the sea area to be surveyed is used as the starting estimated velocigram, or if a bathythermogram is produced in a known manner at any location in the sea area before the start of the surveying trip and the first estimated velocigram is derived therefrom, the number of required changes in the estimated velocigram and the corrections that need to be made in the path of the beam will be relatively slight and require only a short time to compute.

An advantageous method for the accurate acoustic surveying of the surface contours (particularly when combined with the above-mentioned features) and which provides an optimum solution to the problem in question results when the surveying ship is moved in a back and forth or meander shape over the sea area to be covered and the mutually parallel meander sections of the traveled path are placed in such a manner that edge sections of recorded measured contours overlap one another, and the overlapping sections of the measured contours of the already traversed meander section are used as a reference contour for the correction of the momentary course of the ship and/or of the points of echo origin in the measured contours of the subsequent parallel meander section.

Using these features in the surveying method makes it possible to associate the measured depth values with accurate echo origin locations and thus to compensate errors in position determinations of the surveying ship. In the conventionally performed dead-reckoning process, such errors result due to course and speed of the ship starting at a known position. This method according to the invention makes it possible not only to accurately determine the depth values at a high surveying speed, but also to precisely fix their position in the horizontal plane without having to continuously perform time-consuming location determinations with the aid of fixed reference locations. Thus, the method according to the present invention can be used in those sea areas where such reference locations are not available or available only to a limited extent.

The present invention will be described in greater detail with the aid of the embodiment illustrated in the drawing for acoustically surveying the surface contours of a bottom of water.

DETAILED DESCRIPTION OF THE PREFERRED EMBODIMENTS

Figure 1:
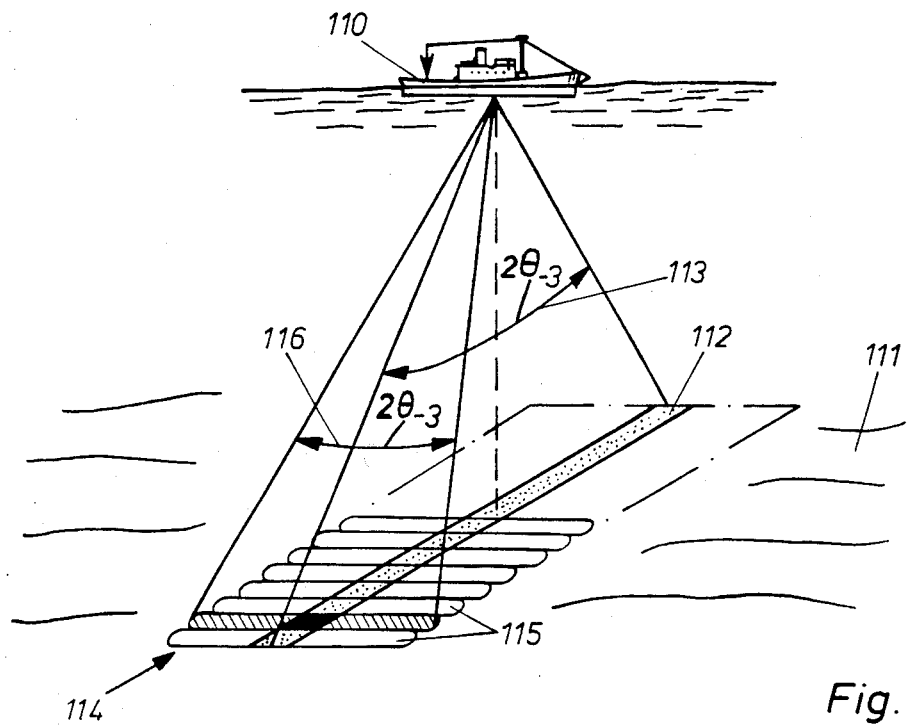
FIG. 1 is a schematic perspective view of a transmitter target strip and fan-shaped receiving strips in the basic or measuring position.
Figure 2:
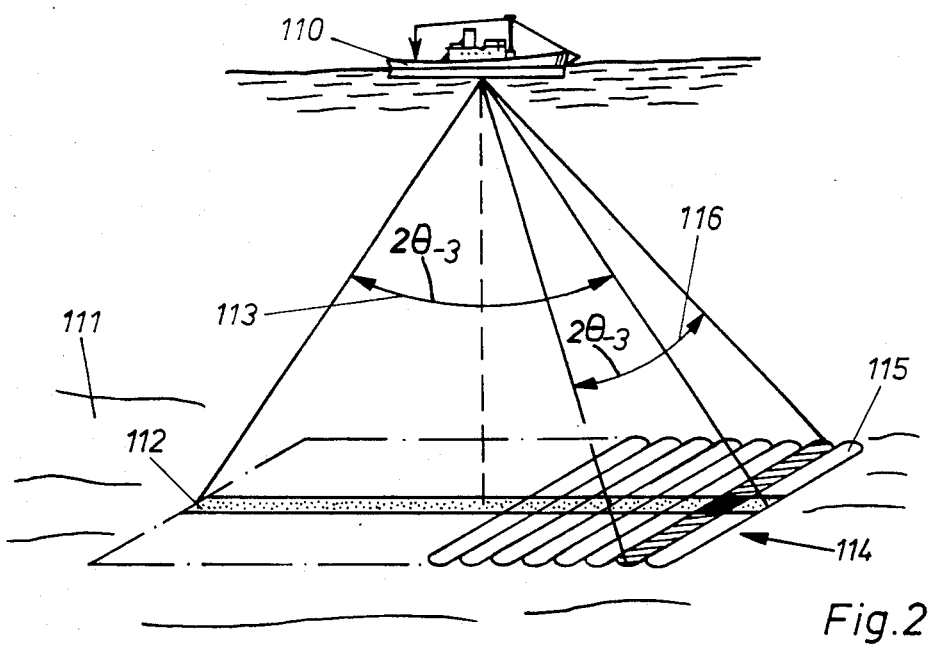
FIG. 2 shows the same schematic view as in FIG. 1 but with the transmitter target strip and the fan-shaped receiver target strips in the pivoted or calibration position.

In the method for acoustically surveying the surface contours of the bottom of a body of water in a sea area, a known echo sounder is employed which has a transmitting and a receiving device installed at the bottom of a water vehicle, for example a surface ship 110 as shown in FIGS. 1 and 2. The arrangement and configuration of the transmitting and receiving devices for the echo ranging system, which are not shown here, are well known in the art and may, for example, be selected as disclosed in U.S. Pat. No. 3,144,631, issued Aug. 11, 1964.

The transmitting device sends sound pulses along a transmitter target strip 112 extending on the bottom of the sea 111 below the ship transversely to its heading. By appropriately designing the transmitter antenna, e.g. as a linear array, and/or by electronic direction formation, the sound beams emanating from the transmitter are bundled in such a manner that they define an aperture angle $2\theta_{-3}$ of approximately 1° in the heading direction and of approximately 60° to 90° transverse to the ship's heading. Such a transmitted sound beam or transmitted beam is shown schematically in FIG. 1 and is marked with the numeral 113.

The echoes produced along the transmitter target strip 112 by way of reflection from the sea bottom 111 are received in a direction selective manner by means of the receiving device. In a known matter, by appropriate electronic processing of the individual received signals, it is accomplished that the receiving device produces a fan 114 of narrow receiving beams 116 or receiving sectors which extend in the direction of the ship's heading and follow one another transversely to the heading. On the sea bottom 111, each of these receiving beams 116 defines a narrow receiving strip 115 as shown in FIGS. 1 and 2. The aperture angle $2\theta_{-3}$ of the receiving beams 116 in the heading direction is about 15° and transversely thereto about 1°. The receiving device is arranged relative to the transmitting device in such a manner that transmitter target strip 112 is covered by a fan 114 of receiving strips 115. In order to take the rolling movement of ship 110 into account, the fan 114 covers only an angle of about 60° transversely to the ship's heading with an aperture angle $2\theta_{-3}$ of the transmitted beam of about 60° so that, for a width of the receiving strips 115 of about 1°, sixty narrow receiving strips 115 are present in fan 114.

To obtain the surface contours of the sea bottom 111, in a manner known in the art (for example see the two above mentioned U.S. patents), sound pulses are emitted in a known manner and the echoes produced in the transmitter target strip 112 at sea bottom 111 are received separately from the individual receiving strips 115 and the travel time of the echoes is measured. From the travel times and the position of receiving strips 115, depth values are now determined according to known, simple geometric calculations and, by association with the respective location of the origin of the echoes, these values result in a measured contour 117 (FIG. 3) of the sea bottom 111 in the area of transmitter target strips 112. The plurality of individual measured contours 117 obtained in the heading, or the direction of travel, of ship 110, when aligned in space, form the surface contour of sea bottom 111 in the surveying area along a so-called surveying track.

This resulting surface contour, or the plurality of measured contours 117, respectively, corresponds to reality only if the speed of sound in water is constant in the entire surveying area. If this cannot be assumed to be the case, as in most cases, the depth values and the measured contours must be corrected by means of the actual sound beam path in the surveying area or in regions of the surveying area. In the method according to the present invention, the correction value required for this purpose is obtained as follows and as explained most easily with the aid of FIG. 3.

Figure 3:
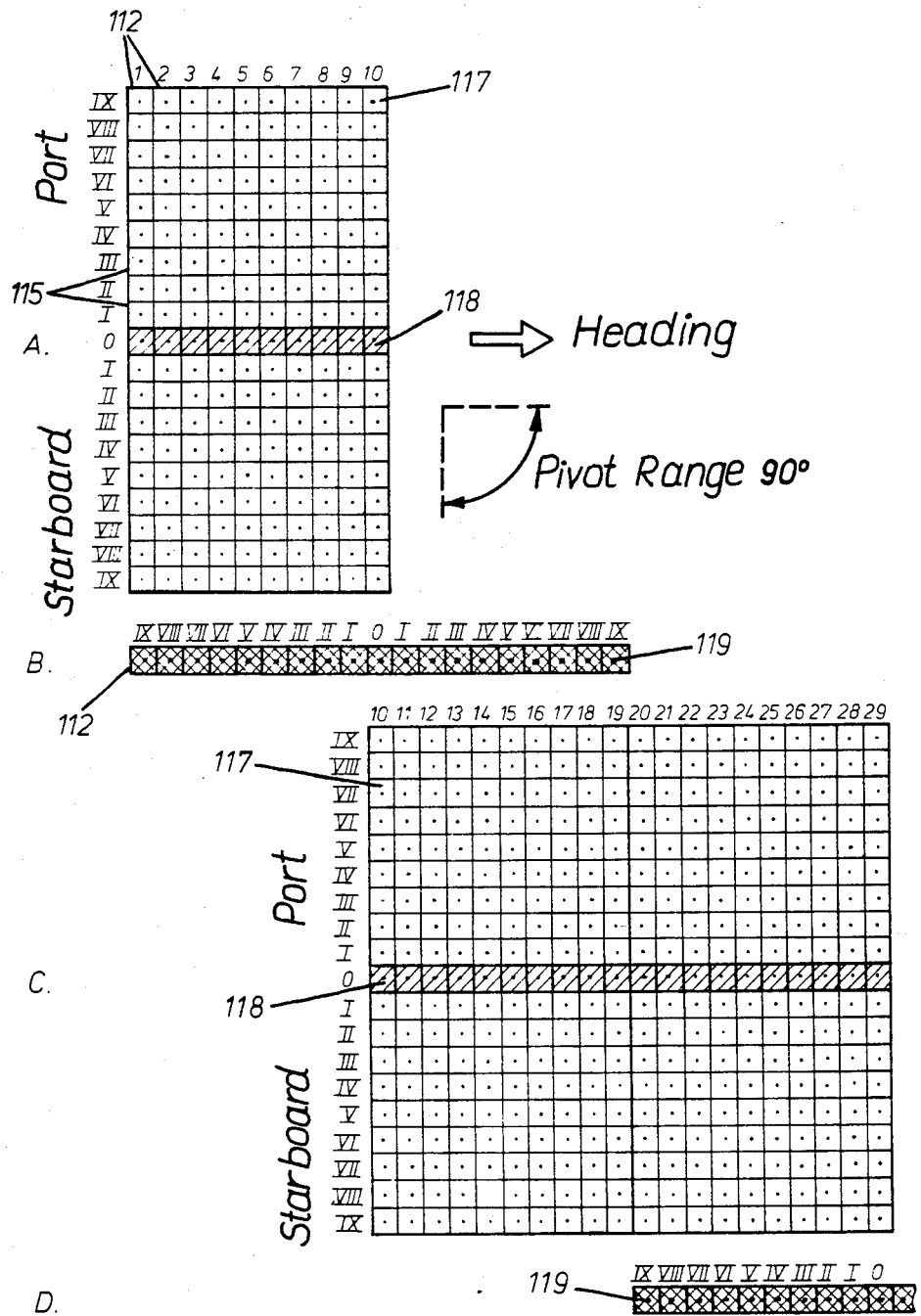
FIGS. 3A–3D are schematic top views illustrating a scheme, according to the invention, for obtaining measured contours and test contours at various times during the travel of the surveying ship.

To simplify the illustration, it has been assumed in FIG. 3 that the receiving device has only nineteen receiving beams 116 which form nineteen receiving strips 115 on the sea bottom 111, with the strip marked 0 being underneath the middle of the ship 110, and with strips marked I through IX to port and I through IX to starboard of the ship 110. The center receiving strip marked 0 lies essentially perpendicularly below the fore-to-aft axis of the ship 110. While the ship 110 is advancing on its course, the transmitting device successively "illuminates", in FIG. 3, a plurality of transmitter target strips 112 which are numbered consecutively 1 through 10 in FIGS. 3A and 10 through 29 in FIG. 3C. In each square defined by the intersection of a receiving strip 115 and the momentary position of transmitter target strip 112, a depth value is obtained as symbolized by a dot in FIG. 3. The depth values of each transmitter target strip 112, when lined up one after the other as shown in FIGS. 3A and 3C, produce the measured contour 117 of the sea bottom 111 transverse to the ship's heading. The depth values in the hatched squares, i.e., the strip marked 0, here constitute, lined up one behind the other, a longitudinal contour perpendicularly below the path traveled by the ship. Since sounding beams, when they penetrate layers of water with different speeds of sound gradients, are not refracted, this longitudinal contour corresponds to the actual conditions at sea bottom 111. This longitudinal contour from the true depth values forms the so-called calibration contour 118.

When ship 110 has traveled a path at least equal to the extent of fan 114 transversely to the ship's heading, according to the present invention, the transmitter beam 113 and fan 114 of receiving beams 116 are both pivoted by 90° from their basic or measuring position shown in FIG. 1 about the elevation axis of the ship 110 into their pivoted or calibrating position shown in FIG. 2. The pivoting may be effected in any desired manner, for example, by combined mechanical rotation of the transmitting and receiving devices or, if the transmitting and receiving antennas or bases have the same geometrical configuration, by switching a relay matrix disposed between the respective antennas and the transmitting and receiving devices so as to separate the individual antenna transducers from the respectively associated device and connect them to the respectively other device. The transmitter target strips 112 and the receiving strips 115 now take on the position shown schematically in FIG. 2. The fan shaped transmitter target strip 112 is now disposed perpendicularly below the longitudinal axis of the ship 110 and the fan 114 of fan shaped receiving strips 115, which are now oriented transversely to the ship's heading, are aligned one next to the other in the heading direction. In the pivoted or calibration position of the echo sounder, shown in FIG. 2, the transmitter target strip 112 precisely covers that part of the surveying area from which calibration contour 118 had previously been obtained and from which subsequently, with the echo sounder pivoted back, a further calibration contour will again be produced in the forward direction of the ship.

The echoes produced in pivoted transmitter target strip 112 are again received separately from the nineteen receiving strips 115. The travel times of the echoes are measured and, under consideration of the receiving direction, the associated depth values are again determined in the same manner. In association with the location of the origin of the echoes, these depth values produce a so-called test contour 119 perpendicularly below the fore-to-aft axis of the ship. Such a test contour 119, recorded in the pivoted or calibration position of the echo sounder, is symbolized by cross-hatching in FIG. 3B.

After recording the test contour 119, which takes only a few seconds, the transmitting beam and receiving beams of the echo sounder are pivoted back to their basic or measuring position and further measured contours 117 are produced during forward travel of the ship. These measured contours are again symbolically shown in FIG. 3C and marked with the numerals 10 through 29. Once the ship has traversed a path corresponding at least to the width of fan 114 transversely to the ship's heading, the echo sounder is again pivoted into the pivoted or calibration position and a new test contour is produced in the above-described manner. This process is shown schematically in FIG. 3D. The process is repeated continually over the entire travel path of the ship.

To determine the desired correction value, if any, calibration contour 118 and corresponding test contour 119 are now compared with one another. If the speed of sound in the water between the ship 110 and the sea bottom 111 is constant, these two contours will coincide. If not, only the depth value from center receiving strip 0 of test contour 119 will coincide with the true depth value of calibration contour 118. The other measured values of test contour 119 will deviate more or less from calibration contour 118. From the deviation between test contour 119 and calibration contour 118, a correction value can now be determined which can serve to determine the actual speed of sound conditions in the water area between the ship 110 and the sea bottom 111. With the aid of this correction value, the calculations for the measured contours 117 recorded in the basic or measuring position of the echo sounder can be corrected so that now an accurate surface contour of the sea bottom 111 in the surveying area is obtained.

The correction value is here obtained by deriving a velocigram from the deviations between test and calibration contours 119 and 118, respectively, so as to indicate the actual curve of the sound speed gradient over the water depth. For this puropse, a so-called estimated velocigram is first provided from the deviations between the test contour 119 and the calibration contour 118, in which the speed of sound is assumed, relatively realistically, to be a function of the depth of the water. With this estimated velocigram, the curve of the sound beam is now calculated for each receiving direction $\alpha_{0x}$ and, with the aid of the measured echo travel times from which test contour 119 has also been obtained, a corrected test contour is now calculated. If this again differs from calibration contour 118, the estimated velocigram is changed. The curve of the sound beam for each individual receiving direction $\alpha_{0x}$ is again calculated with the changed estimated velocigram and a further corrected test contour is calculated by means of the echo travel times known from test contour 119. This process is repeated until the calculated corrected test contour coincides with calibration contour 118. The last changed estimated velocigram then constitutes the correction value with which the measured values of the measured contours 117 are recalculated according to simple geometric relationships.

Figure 4:
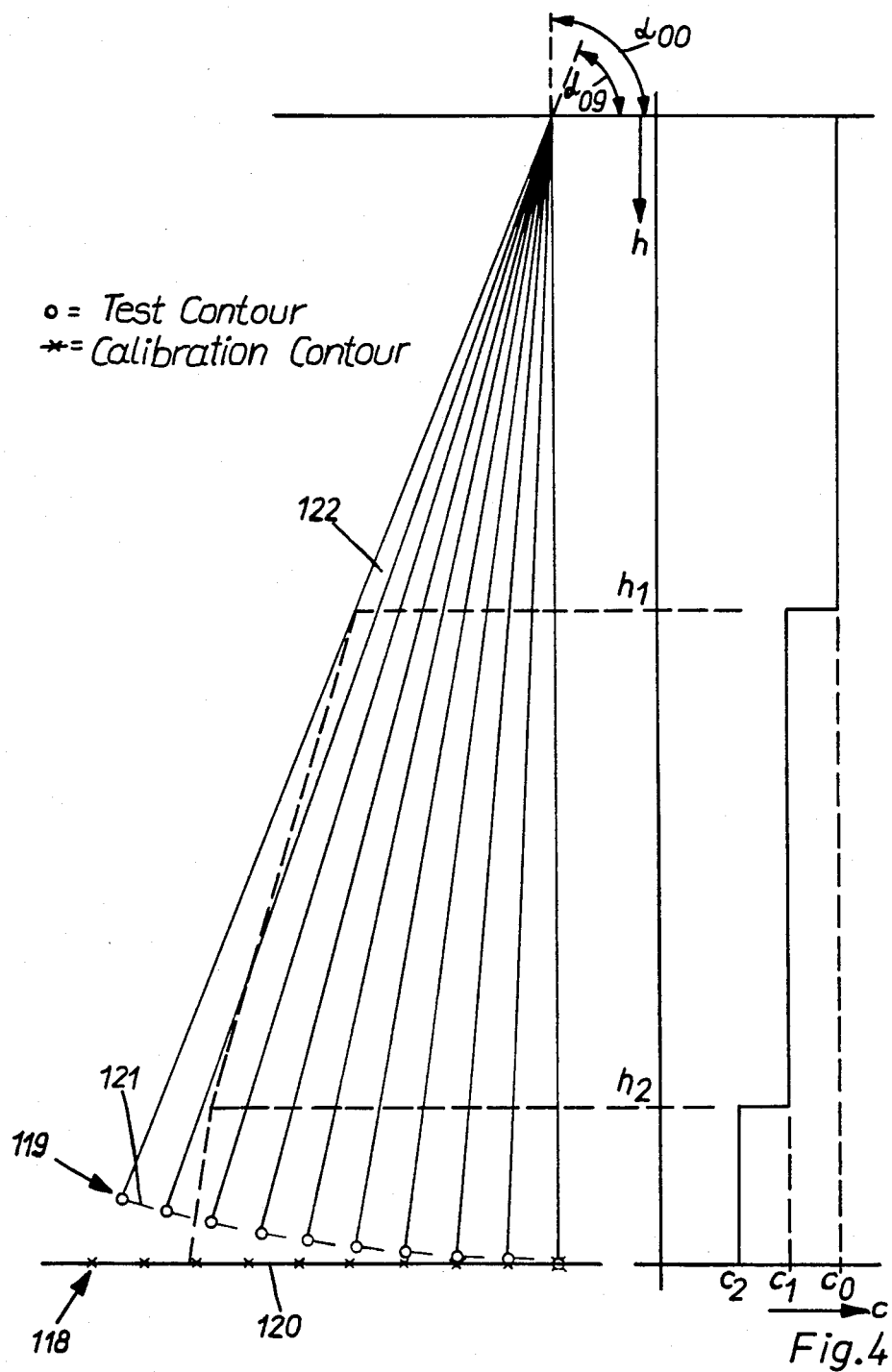
FIG. 4 is a graphic representation of test contours produced with an ideal sound beam path and of a calibration contour and an estimated velocigram.

FIG. 4 shows a simplified illustration of the method for obtaining the correction value. It is here assumed that the calibration contour 118 obtained during the surveying trip for the strip of sea bottom perpendicularly below the ship's heading produces a straight line 120 which is fixed by ten measured values. The test contour 119 recorded in the pivoted or calibration position is again given by ten measured values and is represented by a line 121 which curves upwardly at an increasing receiving angle $\alpha_{0x}$. This test contour 119 was obtained, as described above, from the measured echo travel times under the respective receiving directions $\alpha_{0x}$ and under the assumption of an ideal path for the sound beam at constant speed of sound $c_0$, as shown in FIG. 4 and marked with the numeral 122.

On the right-hand side in FIG. 4, an estimated velocigram is shown for simplified conditions. In two depths of water $h_1$ and $h_2$, sudden changes occur in the speed of sound gradient on the basis of three assumed water layers each having a constant speed of sound $c_0$, $c_1$ and $c_2$, respectively. The calculation of an actual sound beam received under, for example, a receiving angle $\alpha_{09}$ with the aid of this assumed estimated velocigram would result in a sound beam curve as shown with dashed lines on the left of FIG. 4. The calculation of all sound beam curves under each one of the receiving angles $\alpha_{01}$ to $\alpha_{09}$ and under consideration of the associated echo travel times, produces the corrected test contour which, in the present case, coincides with calibration contour 118. The first assumption of the estimated velocigram can here be made with relatively good accuracy in that known velocigrams of the surveying area are used or a velocigram is produced in the previously known and conventional manner at any desired point in the surveying area before the surveying trip is started. Then the number of calculation steps required until the exact velocigram is obtained as the correction value can be reduced considerably. It is also advisable to continuously determine the speed of sound at the location of the transmitting and receiving antenna so that at least the speed of sound $c_0$ of the uppermost layer of water is known when the estimated velocigram is produced and corrected and thus this value need not be considered as a variable. The speed of sound can be calculated in a known manner by measuring the temperature and salt content at the depth of the transmitting and receiving antenna and by using the known calculation formulas according to Kuwahara, Del Grosso, Wilson or Medwin. The Del Grosso formula is disclosed in JASA 56 (1974), 1084–1091 and the Medwin formula in JASA, Vol. 58, No. 6 (Dec. 1975), 1318–1319.

Figure 5:
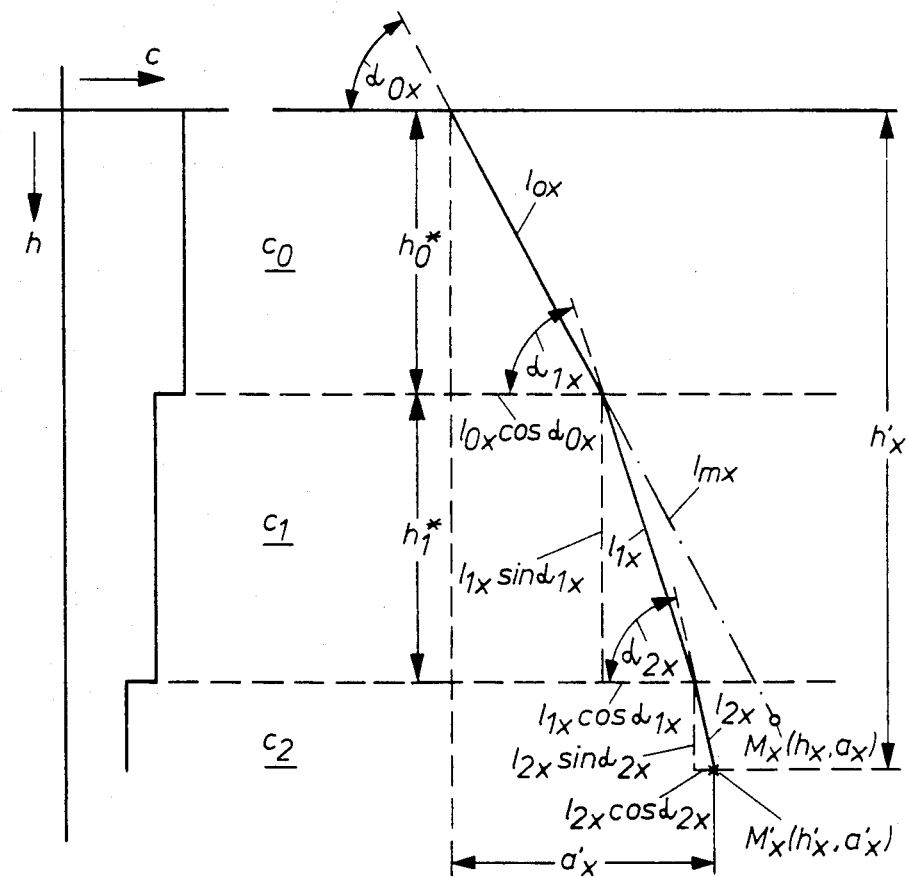
FIG. 5 is a graphic representation explaining a correction calculation for removing distortions from a measured contour.

With the estimated velocigram obtained, by single or multiple changes, indicating the actual curve of the speed of sound as a function of the depth of the water at the momentary measuring location, the measured contours 117 recorded previously or subsequently are corrected as shown in FIG. 5 as a simple example for a measured value $M_x$ of measured contour 117. Measured value $M_x$ at coordinates $a_x$ and $h_x$ results from an echo travel time $t_x$ under the receiving angle $\alpha_{0x}$. With an ideal sound beam curve and the speed of sound $c_0$ in the uppermost layer of water this results in the path $1_{max}$. If there are three layers of water, each having a constant speed of sound $c_0$, $c_1$ and $c_2$, respectively, and the layer depth $h_0^*$ and $h_1^*$, respectively, the sound beam curve shown in FIG. 5 results which is composed of sections $1_{0x}$, $1_{1x}$ and $1_{2x}$. The angles of inclination or refraction, $\alpha_{1x}$ and $\alpha_{2x}$, result, as known, from the Snellius theorem and are as follows:

$$\frac{c_0}{\cos \alpha_{0x}} = \frac{c_1}{\cos \alpha_{1x}} = \frac{c_2}{\cos \alpha_{2x}} \quad (1)$$

From the geometric relationships shown in FIG. 5, the coordinates $a'_x$ and $h'_x$ of the corrected measured value $M'_x$ of measured contour 117 then result as follows:

$$a_x' = \frac{h_0^*}{\sin \alpha_{0x}} (\cos \alpha_{0x} - \cos \alpha_{2x}) + \quad (2)$$

$$\frac{h_1^*}{\sin \alpha_{1x}} (\cos \alpha_{1x} - \cos \alpha_{2x}) + 1_{mx} \cos \alpha_{2x}$$

and $$h'_x = h_0^* \left(1 - \frac{\sin \alpha_{2x}}{\sin \alpha_{0x}}\right) + h_1^* \left(1 - \frac{\sin \alpha_{2x}}{\sin \alpha_{1x}}\right) + 1_{mx} \sin \alpha_{2x} \quad (3)$$

where $\alpha_{0x}$ is the respective receiving direction and $1_{mx}$ is the measured echo travel time $t_x$ in this receiving direction multiplied by the speed of sound $c_0$ in the uppermost layer of water.

In nature, the speed of sound usually does not change as suddenly as assumed in the preceding example. The curve of the speed of sound as a function of the depth of the water, however, can be approximated in all cases with sufficient accuracy by way of a step function if the step width $\Delta h$ is made sufficiently small. Thus for every curve of the sound velocity as a function of the depth of the water, the sound beam calculation can be traced back to the above calculation. The dependence of the speed of sound on the pressure of the water is here neglected, but can be considered in the same manner.

The accuracy of the measured surface contour depends not only on the exact determination of the depth values but also significantly on the accuracy of the continuous determinations of the position of the surveying ship 110, as the echo origin locations are determined on the basis of the momentary position of the surveying ship 110. Conventionally, the exact position of the surveying ship 10 is determined only once or at greater time intervals with the aid of at least one stationary reference point and the momentary individual positions lying therebetween are determined by dead reckoning calculations which are made with the aid of course and speed of the surveying ship 110. However, such dead reckoning calculation has considerable inherent errors which are caused already by the fact that the speed of the ship is measured or can be measured not over the ground but usually only in water and thus, for example, the drift of the surveying ship leads to errors in the determination of the ship's position which cannot be detected. The depth values, which are measured with great accuracy, are then associated with spatially incorrect positions so that the measured surface contour is shifted in the horizontal plane and, in spite of accurate depth measurements, does not meet the requirements for accuracy.

Usually, a sea area is surveyed in such a manner that the surveying ship 110, after it has taken up an approximately linear surveying track representing the surface contour over a width with respect to the ship's heading corresponding approximately to the transverse expansion of fan 114 of receiving strips 115, turns around at the end of the sea area and takes up the next surveying track parallel to the first one in the opposite direction. The surveying area is thus traversed in a meander pattern as this is shown schematically in FIG. 6.

Figure 6:
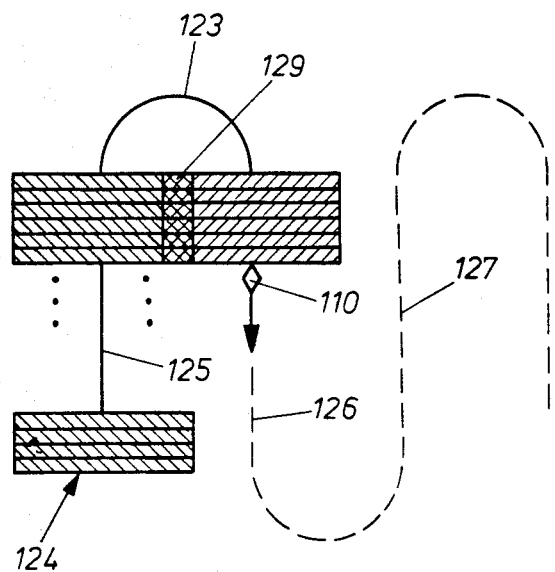
FIG. 6 is a schematic top view of a surveyed track produced by the surveying ship with measuring contours extending to both sides of the path of travel.

FIG. 6 shows the momentary position of surveying ship 110 by a rhombus. The path already traversed by the surveying ship 110 is shown as a solid line and marked 123. The path still to be traversed by the surveying ship 110 is shown in dashed lines. On path 123 already traversed by surveying ship 110, surveying track 124 is produced in that the individual measured contours 117 are lined up one after the other. The already recorded section of surveying track 124 in the first linear meander section 125 is now utilized to correct the position determination of the surveying ship 110 and thus the determination of the echo origin locations on the trip in the second parallel meander section 126. For this purpose, all parallel meander sections 125 and 126, and all subsequent meander sections 127 and so on, are placed in such a manner that the edge sections of measured contours 117 from parallel meander sections 125 through 127 of surveying track 124 overlap (FIG. 6). The overlapping sections 129 of measured contours 117 of already traveled meander section 125 are utilized as reference contours 128 (FIG. 7) with which the overlapping sections 129 of the just recorded measured contours 117 in second meander section 126 which form an overlapping contour 130 are checked for coincidence. The position in space of overlapping contour 130 in the horizontal plane is now corrected in the direction of the ship's heading and transversely thereto until at least partial regions of reference contour 120 and overlapping contour 130 coincide. The thus obtained correction factor $\alpha$ serves for the accurate location determination of momentary measured contours 117, i.e. for the accurate location determination of the echo origin locations associated with the depth values and can simultaneously be used to correct the course of the surveying ship 110.

Figure 7:
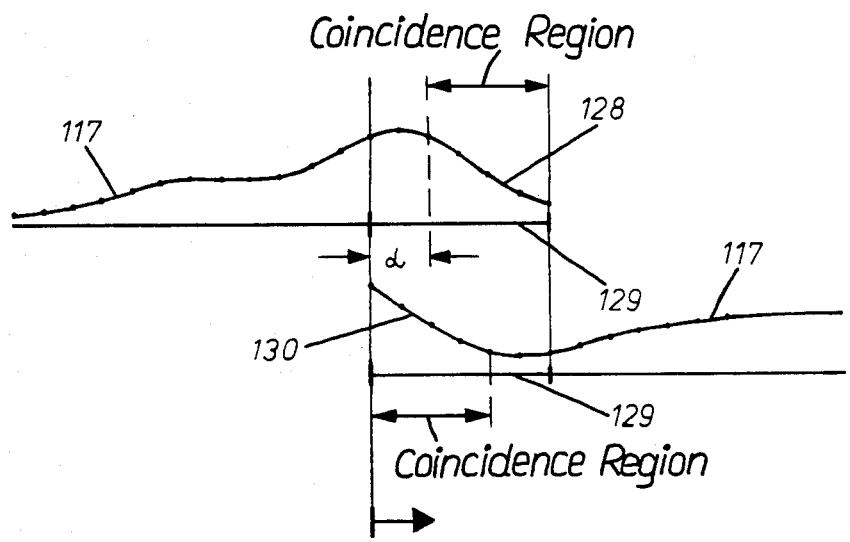
FIG. 7 is a side view of two overlapping measuring contours of the measuring track of FIG. 6.

FIG. 7 is a schematic sectional view of two overlapping measured contours 117 from two adjacent parallel meander sections 125 and 126, one underneath the other. It has been assumed that the position of the surveying ship 110 as determined by dead-reckoning includes an error transversely to the ship's heading due, for example, to drift. In the region of overlapping sections 129, two contours, reference contour 128 and overlap contour 130, are determined from the same strip of sea bottom. These two contours coincide only if overlapping contour 130 is shifted to the right by $\alpha$ in FIG. 7. $\alpha$ then constitutes the correction factor for the accurate calculation of measured contours 117 and of the ship's position, respectively.

The present invention is not limited to the above described embodiment. For example, it is not mandatory to continuously measure and determine calibration contour 118 and test contour 119. Frequently, it is sufficient to recheck from time to time the velocigram determined for a correction of measured contours 117 and to perform the calibration process for this purpose in that the echo sounder is temporarily pivoted by 90° about the ship's elevation axis and test contour 119 is recorded. Care must merely be taken that test contour 119 and calibration contour 118 originate from spatially identical strips of sea bottom 111.

Also, it is not necessary for transmitter target strip 112 to be simultaneously illuminated by the transmitter. To increase the transmitting power and thus the range of the transmitter, the transmitted beam may also be bundled tightly in the direction transverse to the ship's heading so that its aperture angle $2\theta_{-3}$ here again is only a few degrees. However, the transmitted beam must be pivoted correspondingly quickly over the transmitter target strip and, during the spatial determination of the echo origin locations, the pivoting speed of the transmitted beam and the traveling speed of the surveying ship must then be taken into consideration.

Moreover, it is not mandatory, in the basic or measuring position of the echo sounder, for the transmitter target strip 112 to be perpendicularly below the ship and the one receiving strip 0 of the fan 114 to be perpendicularly below the fore-to-aft axis of the ship and, in the pivoted or calibration position, for transmitter target strip 112 to be perpendicularly below the fore-to-aft axis of the ship. If the transmitting and receiving devices are arranged at a distance from the center of the ship or from the ship itself, the perpendicular strips will be offset in parallel thereto. However, in the basic and in the calibration position of the echo sounder, transmitter target strip 112 will always be perpendicularly below the center of the transmitter antenna, i.e. perpendicular to the normal of the transmitter antenna, and receiving strip 0 will always be perpendicularly below the center of the receiving antenna, i.e. perpendicular to the normal of the receiver antenna. The transmitting and receiving devices must of course be arranged relative to one another so that receiving strip 0 of fan 114 in the basic or measuring position, and transmitter target strip 112 in the pivoted or calibration position of the echo sounder, illuminate the same area of the sea bottom, at least in a direction transverse to the ship's heading.

It must be emphasized again that, in order to determine the calibration contour 118, intially only the echo travel times from the transmitted pulses transmitted vertically, i.e. at an angle of 90° with respect to the transmitting antenna, are available. To be able to determine the true depth values of calibration contour 118 from these values, the echo travel times must be multiplied by the speed of sound. Customarily, the speed of sound $c_0$ immediately below the keel, i.e. at the location of the transmitting and receiving device, is used for this purpose, since it can be measured without undue expense. The error made in doing this, under certian circumstances, may be several percent, so that calibration contour 118 already contains a relatively large inaccuracy.

To reduce this initial error, according to a further feature of the present method in order to determine the depth values of calibration contour 118 the echo travel times are multiplied by an average speed of sound $c_m$. This speed of sound $c_m$ is determined in such a way that the error made in the calculation of the calibration contour is less than 0.5 per mille. For this purpose, the travel time $t_{45}$ of the echoes from the received beam which is inclined at 45° and the travel time $t_{90}$ of the echoes from the vertical received beam are measured in the 90° about the vertical axis of the ship pivoted or calibration position of transmitting beam 113 and fan 114 of receiving beams 116. The quotient of the echo travel time $t_{45}$ and the echo travel time $t_{90}$ is divided by $\sqrt{2}$ then multiplied by the speed of sound $c_0$ below the keel and by a correction value a, according to the following equation:

$$c_m = \frac{c_0}{\sqrt{2}} \cdot a \cdot \frac{t_{45}}{t_{90}} \quad (4)$$

The correction value a is determined empirically and is calculated as follows:

$$a = \sin 2 \arccos \frac{1}{2} \frac{t_{45}}{t_{90}} \quad (5)$$

The term travel time of the echoes or echo travel time is here understood to mean half the duration of the period from the time a transmitted pulse is emitted to the time the echo is received.

It will be understood that the above description of the present invention is susceptible to various modifications, changes and adaptations, and the same are intended to be comprehended within the meaning and range of equivalents of the appended claims.

What is claimed is:

1. In a method for acoustically surveying the surface contours of the bottom of a body of water, particularly the bottom of the ocean, with the use of an echo sounder installed on a moving ship and including a transmitting device and a receiving device having respective antennas wherein the transmitting antenna emits sound pulses over a narrow (when seen in the direction of the ship's heading) transmitter target strip extending on the bottom of the body of water essentially perpendicularly below the center of the transmitting antenna and transversely to the ship's heading, wherein the transmitter target strip is covered, by means of the receiving antenna, by a fan which extends, in the ship's heading direction, in the form of a series of narrow receiving strips forming a row transversely to the ship's heading with one receiving strip being disposed essentially perpendicularly below the center of the receiving antenna and wherein the echoes produced at the bottom of the body of water along said transmitter target strip are received separately by the receiving antenna from individual receiving strips, travel times of received echoes are measured and depth values are determined from the travel times to produce a measured contour of said transmitter target strip extending transversely to the ship's heading, in spatial association with the respectively determined point of origin of the echoes as determined by the momentary position of said transmitter target strip and the respective said receiving strip; the improvement comprising providing compensation for the influence of sound beam diffraction by layers of water having different sound propagation speeds by: forming a calibration contour, which extends in the direction of the ship's heading essentially perpendicularly underneath the center of the receiving antenna, from a plurality of said measured contours aligned in the direction of the ship's heading; at selectable points in time, pivoting the transmitter target strip and the fan of receiving strips out of their basic measuring position by a right angle about the elevation axis of the ship to a calibration position, utilizing the echo sounder to measure and record, as a test contour, a contour of the transmitter target strip which now extends in the direction of the ship's heading, and then pivoting the transmitter target strip and the receiving strips back to their basic measuring position; comparing said test contour with a section of said calibration contour which originated from a spatially identical strip of said bottom; deriving at least one correction value from any deviations between said compared test and calibration contours; and correcting the depth values of at least those measured contours in the vicinity of said test and calibration contours by means of said correction value in order to determine the true surface contour of said bottom.

2. A method as defined in claim 1, wherein: said step of deriving includes obtaining a velocigram as said correction value; and said step of correcting includes calculating the actual sound beam curve in water from said velocigram, and utilizing said actual sound beam curve to effect the corrections of the measured contour values.

3. A method as defined in claim 2 wherein said velocigram used as said correction value is obtained by: providing an estimated velocigram on the basis of said deviations between said test and calibration contours; correcting an ideal sound beam curve associated with said test contour on the basis of said estimated velocigram to provide a corrected test contour; comparing said corrected test contour with said calibration contour to determine if there is any deviation; if there is a deviation between said corrected test contour and said calibration contour, (a) changing said estimated velocigram so as to reduce said deviation, (b) recorrecting said ideal beam curve on the basis of the changed estimated velocigram to provide a recorrected test contour and (c) comparing the recorrected test contour with said calibration contour; repeating steps (a), (b) and (c) until a corrected test contour which coincides with said calibration contour is obtained; and utilizing the changed estimated velocigram which produces the corrected test contour which coincides with said calibration contour as said correction value.

4. A method as defined in claim 1 further comprising: moving the surveying ship along a meander path with mutually parallel adjacent sections over the sea area to be covered during surveying of the surface contour;

placing recorded measured contours of the mutually parallel adjacent meander path sections of the traveled path such that the edge sections of the recorded measured contours overlap one another; and utilizing the overlapping edge sections of the measured contours of the already traversed meander section as a reference contour for the correction of the momentary course of the ship or of the points of echo origin in the measured contours of the adjacent subsequent parallel meander section.

5. A method as defined in claim 4, wherein said step of utilizing the overlapping edge sections includes: continuously checking the overlapping sections of the measured contours recorded in respectively adjacent parallel meander sections for coincidence with said reference contour; and utilizing the shift in space of the overlapping contour which leads to coincidence as a correction factor.

6. A method as defined in claim 1 further comprising: determining the depth values of said calibration contour by multiplying the travel times of the echoes from the receiver strips disposed perpendicularly below the center of the receiving antenna by the average speed of sound in the water; and determining said average speed of sound by forming the ratio of the travel time of the echoes from the receiver strip disposed at 45° with respect to the center of the receiving antenna and of the travel time of the echos from the receiver strip lying at a right angle to the center of the receiving antenna in said pivoted calibration position, by dividing said ratio by $\sqrt{2}$, and then by multiplying the resultant by the speed of sound in the water at the location of the transmitting and receiving devices and by a correction value a.

7. A method as defined in claim 6, wherein said correction value a is determined according to the following relationship:

$$\underline{a} = \sin 2 \text{ arc cos } \frac{1}{2} \frac{t_{45}}{t_{90}},$$

where $t_{45}$ is the travel time of the echoes from the receiver strip disposed at 45° below the center of the receiving antenna and $t_{90}$ is the travel time of the echoes from the receiver strip disposed at a right angle with respect to the center of the receiving antenna.

* * * * *